United States Patent
Lepoutere et al.

(10) Patent No.: US 11,477,073 B2
(45) Date of Patent: *Oct. 18, 2022

(54) PROCEDURE FOR MANAGING A FAILURE IN A NETWORK OF NODES BASED ON A LOCAL STRATEGY

(71) Applicant: BULL SAS, Les Clayes sous Bois (FR)

(72) Inventors: Guillaume Lepoutere, Grenoble (FR); Emmanuel Brelle, Grenoble (FR); Florent Germain, Le Pont de Claix (FR); Piotr Lesnicki, Grenoble (FR)

(73) Assignee: BULL SAS, Les Clayes sous Bois (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/449,120

(22) Filed: Jun. 21, 2019

(65) Prior Publication Data

US 2019/0394085 A1 Dec. 26, 2019

(30) Foreign Application Priority Data

Jun. 22, 2018 (FR) ...................................... 1855559

(51) Int. Cl.
*H04L 41/06* (2022.01)
*H04L 41/0668* (2022.01)
*H04L 41/0853* (2022.01)

(52) U.S. Cl.
CPC ...... *H04L 41/0668* (2013.01); *H04L 41/0856* (2013.01)

(58) Field of Classification Search
CPC .............................. H04L 12/24; H04L 41/049
See application file for complete search history.

(56) References Cited

U.S. PATENT DOCUMENTS 5,696,895 A * 12/1997 Hemphill ............ G06F 11/2033
714/E11.073
7,089,281 B1 8/2006 Kazemi et al.
(Continued)

FOREIGN PATENT DOCUMENTS

EP 0760503 A1 3/1997
WO 9854648 A1 12/1998
(Continued)

OTHER PUBLICATIONS

French search report (FR-SR), dated May 22, 2019, from corresponding application FR1855559.

*Primary Examiner* — Sulaiman Nooristany
(74) *Attorney, Agent, or Firm* — Meagher Emanuel Laks Goldberg & Liao, LLP

(57) ABSTRACT

Disclosed is a failure management method in a network of nodes, including, for each considered node: first, a step of locally saving the state of this considered node, to a storage medium for this node in question. Then, if the considered node has failed, retrieving the local backup of the state of this considered node, by redirecting the link between the considered node and its storage medium to connect this storage medium to an operational node other than the considered node, this operational node already in the process of carrying out this calculation, the local backups of these considered nodes, used for the retrieving steps being coherent with each other so as to correspond to the same state of calculation. If a considered node failed, returning this local backup for this considered node to a new additional node added to the network at the time of the failure.

16 Claims, 4 Drawing Sheets

(56) References Cited

U.S. PATENT DOCUMENTS

| | | |
|---|---|---|
| 9,619,389 B1 * | 4/2017 | Roug .................... G06F 11/00 |
| 2014/0215481 A1 | 7/2014 | Piet et al. |
| 2015/0149814 A1 | 5/2015 | Ren et al. |

FOREIGN PATENT DOCUMENTS

| | | |
|---|---|---|
| WO | 2015070236 A1 | 5/2015 |
| WO | 2017193846 A1 | 11/2017 |

* cited by examiner

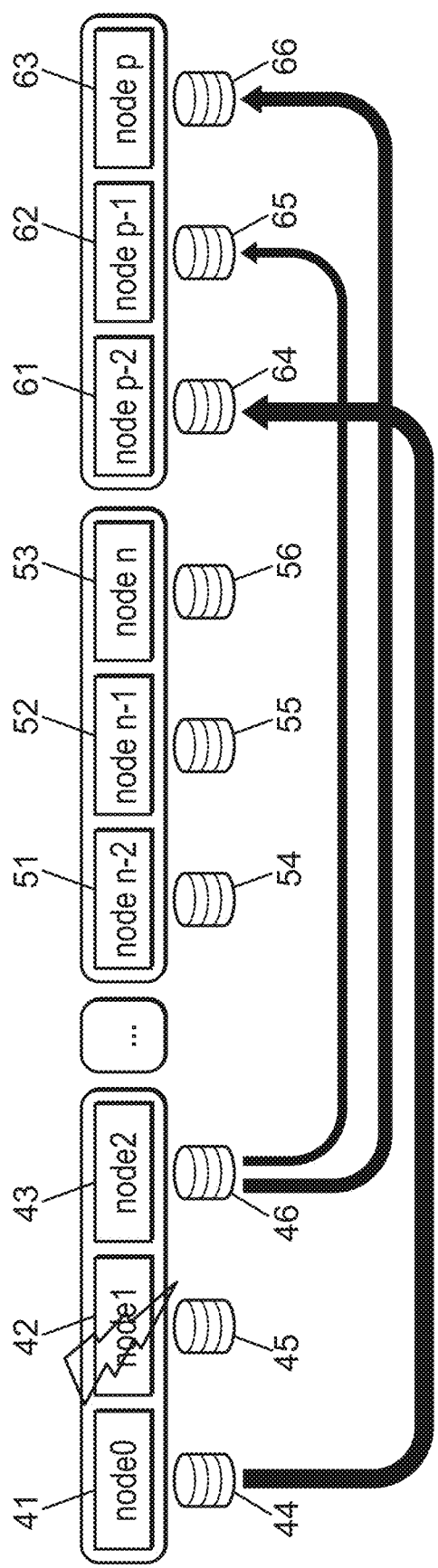
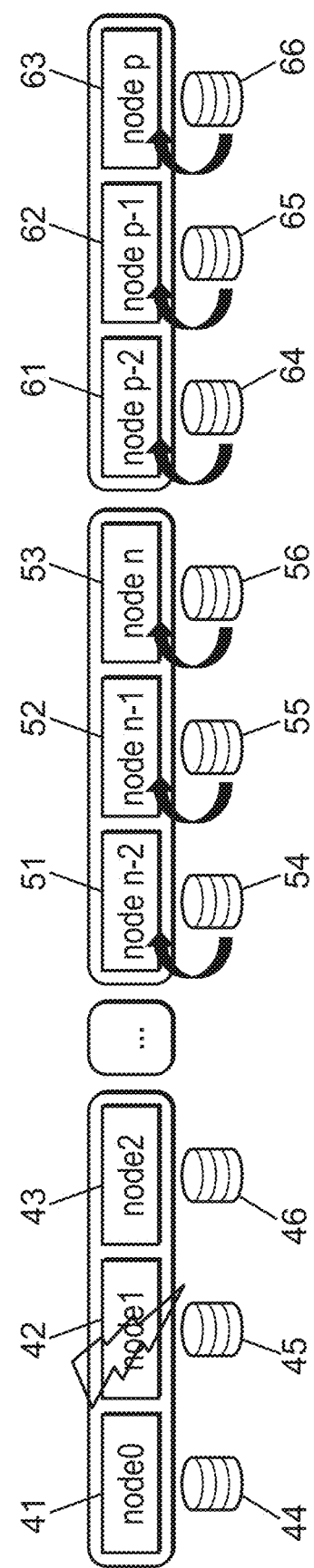
FIG. 5
FIG. 6

PROCEDURE FOR MANAGING A FAILURE IN A NETWORK OF NODES BASED ON A LOCAL STRATEGY

FIELD OF THE INVENTION

The invention relates to methods for managing failures in a node network and node network sections associated with this failure management.

BACKGROUND TO THE INVENTION

In a network of nodes performing the same calculation, backups are performed at one or more levels. Therefore, these are multilevel backups. When a failure occurs, the calculation can be recovered at least partially without requiring a complete restart, quite simply thanks to the backups made. Depending on the type of failure, a certain level of backup is used to recover the calculation in part or even in terms of the majority or almost completely.

Distributed applications can last much longer than average, without any network failure, also called MTBF of a cluster ("Mean Time Between Failures"), so they are many opportunities for interruption. In general, they do not have an internal failure-management solution, which can then lead to the loss of local backup data in the event of a physical failure of the compute node. This is then followed by the loss of all the calculation steps caused by the loss of a single compute node but whose local backup data can no longer be recovered.

There are backup and retrieving solutions known as "checkpoint/restart" solutions from backups, allowing applications to regularly save their context on different levels of backup according to at different speeds.

The different backup levels range from very local to very global, from the simplest and fastest to the most complex, slowest, and most expensive, the least robust and weakest to the most robust and resilient backup.

A previous method, according to the FTI library ("fault tolerance interface") states that there are four known levels of backup, which are:

The first level, L1, which carries out a local backup. This is simple and inexpensive and performed very often, resulting in the minimal loss of computation time during a failure and with retrieving ability at this first level, L1, The second level, L2, which performs a first intermediate backup by duplication on a partner node, is less simple and a little more expensive, resulting in a greater loss of computation time during a failure, with retrieving only possible at this second level, L2, The third level L3, which makes a second intermediate save by Reed-Solomon encoding, is even less simple and still a little more expensive, resulting in an even greater loss of computing time during a failure and recoverable only at this third level, L3, The fourth level, L4, which performs a global backup in terms of the file system is complex and quite expensive, resulting in a really significant loss of computing time during a failure, with retrieving only possible at this fourth level, L4.

From the local level, L1, to the global level, L4, the backup becomes more and more robust and resilient, but it also becomes more and more complex and expensive. For this reason, a backup at the first level, L1, is often performed, a backup at the second level, L2, is performed a little less often, a backup at the third level, L3, less often still and a backup of the fourth level, L4, is relatively rare. Therefore, statistically, when a failure occurs, the last coherent state that can be recovered is very recent at the first level, L1, a little less recent at the second level, L2, less recent still at the third level, L3, and even older at the fourth level, L4. Consequently, the volume of work lost is very small at the first level, L1, relatively limited at the second level, L2, notable at the third level, L3, and greater at the fourth level, L4.

SUMMARY OF THE INVENTION

The object of this invention is to provide a means of failure management in a node network by at least partially overcoming the aforementioned drawbacks.

More particularly, the invention aims to provide a means of failure management in a network of nodes by improving the compromise between efficiency on the one hand and cost and complexity on the other hand, for at least one level of backup considered.

More particularly, the aim of the invention is to provide a means of failure management in a network of nodes with an efficiency similar or comparable to that of an intermediate-level backup, preferably the first intermediate backup, the second level, L2, being more advantageous in terms of the cost and complexity being similar or comparable to those of a local level backup, preferably those within the first level, L1.

To achieve this, the invention proposes to create a link between a storage medium and its redirection node to another node, so the backup is made on the storage medium when the node is defective, possibly by making a copy on a neighboring node, but without the backup copy on this neighboring node for the majority or all of the nodes that have not failed. The link between a storage medium and its node is not carried out directly, but indirectly through a network element able to reconfigure this link in order to link this storage medium to another node when the previous node starts to fail. This network element links several nodes to their respective storage media, each node being connected to its associated storage medium (or possibly to its associated storage media).

In summary, a backup is available for failing nodes despite the failure of this node, resulting in a similar efficiency level as for the second level, L2, but without a more complex operation than a simple local backup for the majority or all of the nodes which are not failing, which is the majority or even the greater majority of the nodes in the network that carry out the calculations under consideration, with a cost and a complexity at least comparable if not similar to those of the first level, L1.

Thus, according to methods of implementation for the invention, the cost of the second level, L2, is saved, while the ability to restart an application from the backups at the first level, L1, is maintained in the event of a failure in a compute node. The copy to a neighboring node traditionally performed at the second level, L2, is not carried out here during the execution of the application in preventive terms for all the compute nodes, but only in the case of a breakdown and only for the nodes that have failed after the breakdown has happened. The copy is only then made to relaunch the application with the missing data by uploads from the local backup.

On one hand, this backup of a cost and complexity similar or comparable to a local backup has the effectiveness of an intermediate backup, which greatly improves its value for money.

On the other hand, this backup is of a cost and complexity similar to or comparable to a local backup with the efficiency of an intermediate backup, preferably enables the replacement of both a conventional local backup and one or more conventional intermediate backups, by not keeping anything other than the global backup as a last resort to handle the most severe failures. Most of the failures can now be managed by the local-intermediate backup proposed by the invention, the latter being as effective as an intermediate backup but practically at the cost of a local backup.

This backup provided by the invention is the optimal compromise between efficiency and complexity and is used according to a local strategy. In this local strategy, the link redirection mechanism between calculation nodes and their associated memory is used to recover the backup of a failing node and attach it to a new node added upon this occasion and, as an advantage during the same task, nodes that are non-failing, and preferably not integrated with a computing blade that has a failing node, are kept and relaunched from their own local backup.

In this way, preserving local backups for all non-failing nodes makes relaunching easier.

Thus, any risk of complexification by performing a relaunching associated with a global backup is avoided.

A more local strategy would use the link redirection mechanism between compute nodes and associated memory to retrieve the backup of a failing node and integrate it into a global backup so that a new task can be relaunched by the resource manager.

For this purpose, this invention proposes a failure management method in a network of nodes, comprising, for each considered node of all or part of the nodes of the network performing a same calculation: first, a local backup step for the network; the state of this considered node, through a storage medium of this considered node, where the link between this storage medium and this node can be redirected from this storage medium to another node, then, if the considered node fails, a step local backup retrieving the state of the considered node, by redirecting said link between the considered node and its storage medium so as to connect this storage medium to an operational node that is different from the considered node, this operational node being already performing the calculation, the local backups of these nodes considered, used for the retrieving steps, are coherent to each other so they correspond to the same state of this calculation, then, if at least one node considered has failed, a step of returning the local backup of the considered node to a new additional node added to the network upon the failure of this considered node.

According to preferred versions, the invention comprises one or more of the following characteristics which can be used separately, in partial combination with one another or in total combination with one another, applied to the object of the invention mentioned above.

Preferably, in the return step, all the local backups of the nodes that are part of the same calculation blade as that of the failed node are returned to a new calculation blade added to the network during the failure of the considered node.

Thus, on one hand, the redirection of the link between the medium and the node can be carried out even if there is a major failure and even relatively generalized within a whole computing blade. On the other hand, when the new computing blade is fully operational, a new failure may subsequently arrive within this new computing blade and be managed in a similar way by the mechanism recommended by the invention, whereas if the same calculation blade had been retained, a new failure within the same blade of the conserved calculation would have been more difficult to manage.

Preferably, the management process for a failure comprises, after the return step, a relaunching step for the calculation based on the local backups during the same task as the task during which a node starts to fail.

Therefore, the relaunching is even more simple and quick to perform and disturbance to the running calculation, due to the retrieving of the failure that occurred, is well minimized so that the downtime for implementing this calculation in progress is suitably reduced.

Preferably, during the relaunching step: the relaunching of the considered node, when not failing and not belonging to the same computing blade as a failed node, is performed from the local backup of the state of this considered node, the relaunching of an operational node that is different to the considered node, if the considered node is failing, is carried out from the retrieving of the local backup for the state of this considered node by the operational node, the retrieving performed via an intermediate node which is located on the same calculation blade as the considered node but this is distinct from the considered node and distinct from the operational node and preferably, the relaunching of an operational node that is different to the considered node, if the considered node belongs to the same calculation blade as a failing node, is carried out from the retrieving of the local backup of the state of this considered node by the operational node.

Thus, the retrieving of the local backup of the failed node is performed in a simpler and faster way, the retrieving node being very close to the failed node.

Preferably, all the relaunching steps for the nodes are synchronized with one another so as to relaunch all these nodes in the same calculation state.

Therefore, this ensures complete consistency of the rest of the calculation performed after the relaunch.

Preferably, all these steps are performed for all the nodes of the network performing the same calculation.

Thus, the benefit of the failure management method proposed by the invention is generalized by being extended to all the nodes of the network performing the same calculation.

Preferably, the redirection of said link between the node in question and its storage medium so as to connect the storage medium to the operational node is achieved by a change of routing via a switch connecting several nodes to their storage media.

Therefore, this redirection is performed by a simple operation performed for a network element that is reliable and controlled.

Preferably, the retrieving step changes the attachment of the local backup storage medium from the state of the failed node through a switch to which the failed node was attached and its local backup storage medium for the state of the failed node, but without going through the failed node itself.

Therefore, the redirection can be performed even in the case of a complete physical failure of the failed node.

Preferably, the change of attachment is achieved by sending a command to the switch, this command passing through one of the nodes attached to the switch and using a management port.

Thus, the management port is assigned to recover the storage media for the failed nodes attached to the same switch.

Preferably, this switch is a PCIe switch (Peripheral Component Interconnect express).

This switch is particularly advantageous because it is particularly suitable for devices communicating with each other without having to go through a microprocessor. Therefore, it is able to bypass a failing computing node, for example.

The use of this PCIe switch allows the storage medium, for example a storage disk, to be reattached, this containing the local backups of the failed computing node to another computing node. This operation is fast and does not require a systematic copy of local backup data, and, in particular, not for compute nodes without failures.

Preferably, 3 to 10 nodes are attached to the same switch.

Thus, the switch can easily manage this small group of nodes in the case of a failure of a node within this small group.

Preferably, the failure management method also includes, for all or part of the nodes of the network performing the same calculation, even if no considered node fails, a global backup step for all of these nodes, performed less often than all the local backup steps for these nodes.

Thus, on the one hand, the local-intermediate backup offered by the invention to manage the vast majority of failures in a simple and efficient manner, and on the other hand the global backup, which is more complex and more expensive but reserved for a minority of severe failures, are an excellent compromise between the overall complexity and overall efficiency of the failure management method proposed by the invention.

In the context of a failure-tolerant application, using multiple backup levels as here, with a fast local backup and a more complex and expensive remote global backup, the failure management method proposed by the invention then allows the application to restart, following a physical failure on a node, even if this is a complete failure, and in most cases, starting from all the local backups, which are more recent and less expensive, instead of having to restart remote backups that are often significantly older. However, some rarer failure cases can require the use of a remote global backup. The ability to recover local data from the failed compute node allows you to restart the application from most recent local backups in most cases.

Preferably, for all or part of the nodes on the network performing the same calculation, the storage media will be flash memories.

Thus, the memories used are simple, fast and permanent.

Preferably, these flash memories are NVMe (Non-Volatile Memory express) memories.

Therefore, the memories used are particularly well suited to communicate with a PCIe switch (Peripheral Component Interconnect express).

Preferably, the network of compute nodes comprises at least 1000 compute nodes, ideally at least 5000 compute nodes, better still, at least 10000 compute nodes, making the failure management method according to the invention all the more important because the complete loss of a current calculation then becomes all the more critical due to the large network.

The principle of failure tolerance is all the more important when an application runs on a cluster that consists of a larger number of compute nodes. The greater the number of processors, memory and other devices, the greater the probability that a failure will occur before the end of the execution process. Applications that are intended to run on this type of platform will use fault tolerance libraries ("checkpoints") that allow them to safeguard the data needed for a "restart" in a state as close as possible to the state that existed just before the failure. Thus, these applications are not forced to restart the calculation from the beginning.

Other features and advantages of the invention will become evident upon reading the following description of a preferred version of the invention given with an example and reference made to the accompanying drawings.

BRIEF DESCRIPTION OF THE DRAWINGS

FIG. 5 diagrammatically represents an example of the progress of a duplication step for local backups of all the compute nodes within a calculation blade where a node or at least one node has failed, with the nodes from another computing blade added during the failure management method according to one version of the invention.

FIG. 6 diagrammatically represents an example of the progress of a step for relaunching the calculation from the own local backups of all the calculation blades without a failing calculation node and for the new calculation blades added from the duplication of the backups of the nodes within the computing blades that have at least one failing node, the t calculation being relaunched during the same task during which the failure took place causing the failure of at least one compute node during the process of failure management according to one version of the invention.

DETAILED DESCRIPTION OF THE INVENTION

Figure 1:
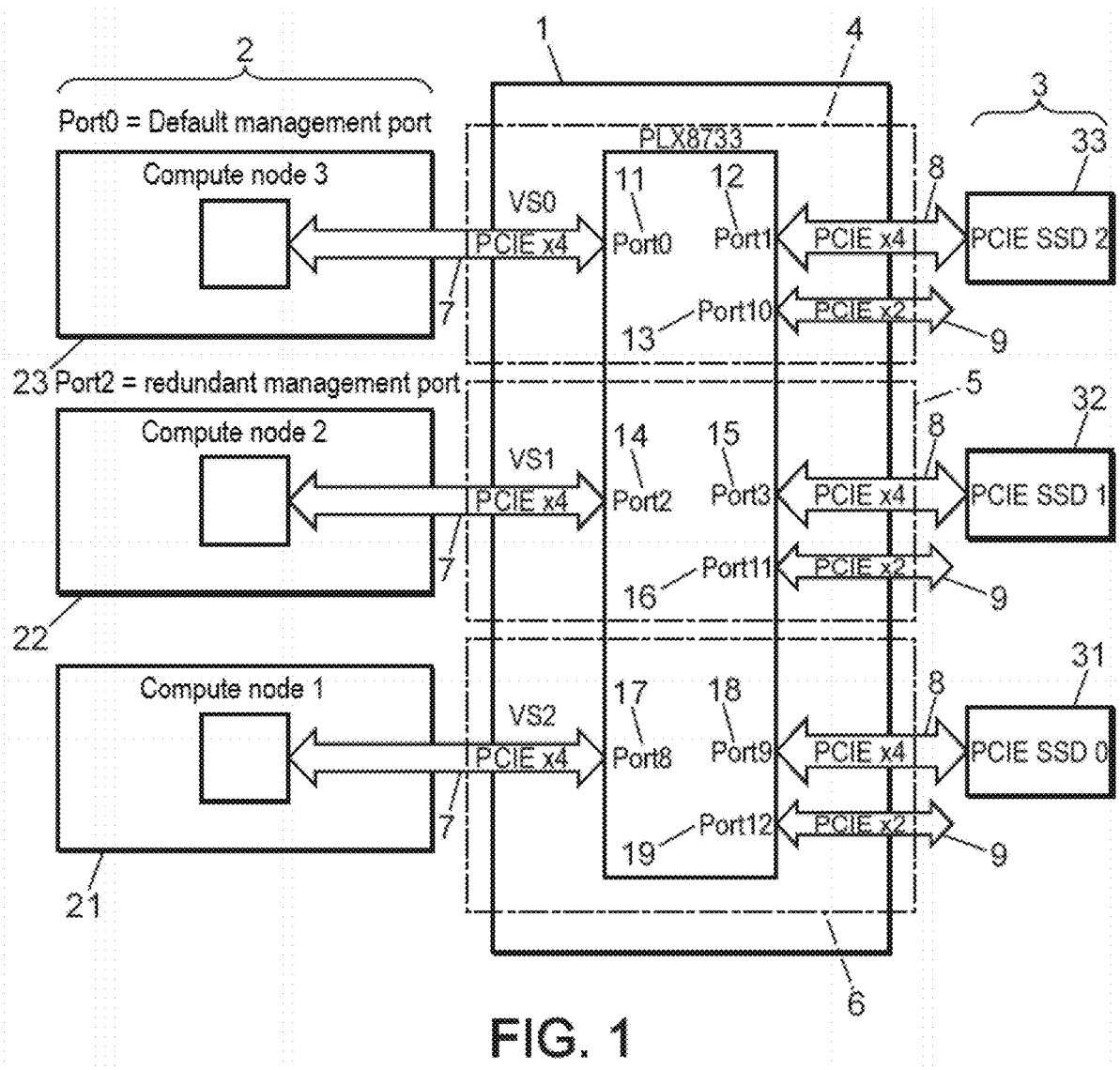
FIG. 1 diagrammatically represents an example of a network part including a group of nodes and their storage media connected to each other by a PCIe switch, according to one version of the invention, for a part of the network where an example of a failure management method can take place according to the invention.

FIG. 1 diagrammatically represents an example of a network part including a group of nodes and their storage media connected to each other by a PCIe switch, according to one version of the invention, at the part of the network where an example of a failure management method according to the invention can take place.

This part of the network comprises several compute nodes 2, three compute nodes 21, 22 and 23, in the example in FIG. 1, as well as several storage media 3, three storage media 31, 32 and 33 in the example in FIG. 1.

These compute nodes 2 and their storage media 3 form a group of calculation nodes managed by a PCIe switch 1 connecting these compute nodes 2 to their respective storage media 3 via PCIe bidirectional connections 7, 8 or 9. These PCIe connections 7, 8 or 9 may be PCIe multi-way connections. The connection 7 is a 4-way connection. The connection 8 is a 4-way connection. The connection 9 is a 2-way connection, here not yet used, each connection 9 being on the one side attached to one of the ports 13, 16 or 19 and remaining free on the other side. Each PCIe connection 7 respectively connects one of the calculation nodes 21 to 23 to one of the ports 0, 2 or 8 (numbering for the electronic switch PLX 8733, but another PCIe Switch can be used), referenced as 11, 14 or 17 respectively in FIG. 1 of switch 1. Each PCIe connection 8 respectively connects one of the storage media 31 to 33 to one of the ports 1, 3 or 9, referenced respectively as 12, 15 or 18 in FIG. 1 of switch 1. The connection 7, the ports 0 and 1, referenced respectively 11 and 12 in FIG. 1 of switch 1 and connection 8 together form a link 4 connecting the compute node 23 to its storage media 33. The connection 7, the ports 2 and 3, referenced respectively 14 and 15 in FIG. 1 of switch 1 and connection 8 together form a link 5 connecting the compute node 22 to its storage media 32. The connection 7, the ports 8 and 9, respectively referenced 17 and 18 in FIG. 1 of switch 1 and connection 8 together form a link 6 connecting the compute node 21 to its storage media 31. PCIe 7, 8 or 9 connections can be grouped on a PCIe bus.

The compute node 23 is attached to the management port or default management, i.e., it is through this that the consignments transit towards the exterior for the group of compute nodes 2 and receptions from the exterior of the compute nodes in group 2. In the event of failure of this computation node 23, this is replaced by the computation node 22 which is attached to the redundant management port or management and compute node 22 then becomes attached to the new effective management port or management.

When a compute node fails physically, for example, compute node 21 or compute node 22, we will consider here compute node 21, the last recent local backup of its computation state is stored on its storage medium 31.

In a system based on a previous method, the storage medium 31 being accessible only by its computing node 21 and the latter being in complete physical breakdown, this recent local backup would become inaccessible. Then, it would be necessary to resort to other more complex and less recent backup levels, resulting in a significant loss of overall efficiency for the computer network.

In the system according to one version of the invention, shown in FIG. 1, the storage medium 31's attachment is reconfigured, i.e., the storage medium 31 will cease to be connected to its compute node 21, to which it is attached by default, but will become connected to compute node 23, which is attached to the default management port and will be able to trace the local backup for the calculation of the failed computing node 21, since the storage medium 31 is linked to another spare computing node outside of the group of compute nodes 21 to 23, this other compute node then taking over the calculation task interrupted at the failed compute node 21 from the local backup of the computing state of compute node 21, sent back from storage medium 31 during the same task as the task during which the failure occurred causing the failure of at least one compute node.

In switch 1, (numbering of the electronic switch PLX8733, but another PCIe switch can be used) referenced 18 (in FIG. 1), instead of remaining permanently connected to port 8 referenced 17 as before the failure of compute node 21, port 9 will be, at least temporarily, connected to port 0 referenced 11 to allow compute node 23 to read from the storage medium 31 the saved data representative of the calculation state of calculation node 21 just before or shortly before its failure. So, the local backup of the calculation state of the compute node 21 in storage medium 31 before its failure will be able to revert back to compute node 23 and be used to relaunch the calculation with a very good compromise between simplicity of the backup and efficiency of the relaunching.

If node 23 starts to fail, it is first replaced by compute node 22 as attached to the management port and compute node 22, as attached to the new management port, performs the operations previously performed by compute node 23 had it not become defective.

The management of switch 1 is now described by a manual scenario clarifying and explaining the various operations to be performed, such as, for example, the migration of storage medium 31 from a failing compute node 21 to a spare compute node 23, the transfer of data and restarting the application. Data management on the application side is performed by the FTI library.

The executed application is provided in the examples of the FTI library: hdf.exe. This application is launched on two compute nodes. It will perform local backups on NVMe storage disks attached to these compute nodes by the PCIe switch at regular intervals as well as a global backup on a NFS server (Network File System) less frequently. Once the application is launched, a failure is generated on one of the two compute nodes. The migration of the NVMe storage disk from the failed node to another node will then allow the transfer of data from the last local backup of that failed node to another node. Once this transfer is carried out, the application can be relaunched and resumes the calculation using the last local backup of the two compute nodes instead of the last older global backup of the network part.

In this context, failure retrieving is performed with the local backup data from an MPI (Message Passing Interface) application for a failed compute node. The data is retrieved by migrating the storage medium of the failing compute node to a compute node adjacent to the same compute blade. This data is then transmitted to a second operational node which will resume the calculation. The advantage of this failure retrieving is that it allows the application to restart from local backups of all compute nodes. These less expensive local backups are also newer most of the time, and are, at worst, as recent as global backups. In addition, the amount of data transferred to resume the calculation will be lower than for a restart from a global backup.

In the following development, the parts of text in a box or in brackets concerns lines of computer code.

The Fault Tolerance Interface (FTI) library will use, in particular, four existing main functions and four existing complementary functions.

The four main functions are "FTI_Init", "FTI_Finalize", "FTI_Protect", "FTI-Snapshot"; more precisely:
int FTI_Init (char* configFile, MPI_Comm globalComm)

"FTI_Init" reads a "configFile" configuration file, creates control point directories, detects the system topology, initializes the FTI communicator using "globalComm" and regenerates the data after retrieving. This function returns «FTI_SCES» in the event of success or «FTI_N-SCS» in the event of failure. This function should be called upon before the other FTI functions, just after the MPI (Message Passing Interface) initialization.
int FTI_Finalize( )

"FTI_Finalize" frees allocated memory, upon completion, transfers to a dedicated process and cleans checkpoints and metadata. This function returns "FTI_SCES" for an application process or "exit(0)" for a header process. This function should be called upon before "MPI_Finalize( )".
int FTI_Protect (int id, void* ptr, long count, FTIT_type type)

"FTI_Protect" stores metadata about the variable to be protected. Each protected variable is identified by "id". Its address "ptr", the calculation of the number and type of element to safeguard this variable can be changed during execution.

int FTI_Snapshot( )

"FTI_Snapshot" loads the checkpoint data, initializes the runtime variables after retrieving and writes the multilevel checkpoints according to their required frequencies.

The four additional functions are "FTI_Checkpoint", "FTI_Recover", "FTI_InitType", "FTI_Status".

The function "FTI_Snapshot( )" can be replaced by the function "FTI_Checkpoint" and by the function "FTI_Recover".

More precisely:

int FTI_Checkpoint (int id, int level)

"FTI_Checkpoint" writes the values of the protected execution variable "id" to a checkpoint file at the required level.

int FTI_Recover( )

"FTI_Recover" loads the checkpoint data from the checkpoint file and initializes the runtime variables.

int FTI_InitType(FTIT_type* type, int size)

"FTI_InitType" initializes a new data type called "type", its size being in bytes.

int FTI_Status( )

"FTI_Status" returns the current state of the retrieving flag. This state can be "0" if no control point has been successfully completed or recovered, "1" if at least one control point has been completed, or "2" if the execution has been relaunched from an L4 checkpoint and if "keep_last_checkpoint" was enabled during the last run.

To provide a failure-resilient process using the hardware and failure-tolerant software described in this patent application, it is interesting to develop some improvements in the "SLURM" ("Simple Linux Utility for Resource Management", especially the "checkpoint-restart" option, and the "SLURM_JOB_NODES_DOWN" and "SLURM_RESTART_COUNT" variables.

The "checkpoint-restart" option is added for the "sbatch" function. If installed, a flag in the task record is installed to inform the SLURM controller to allocate nodes based on the layout of the PCIe switches defined in the "switch.conf file". This file can be generated thanks to a script generator presented in Annex 1 at the end of the description. An example of such an implementation of this file is now shown here:

---

Priority=10
Root=Cluster
Root level Layout configuration
Entity=Cluster Type=Center Enclosed=pci[0-1]
Switch level Layout configuration
Entity=pci0 Type=Switch NodeList=trek[0-1,4] Enclosed=trek[0-1,4]
Entity=pci1 Type=Switch NodeList=trek[5-7] Enclosed=trek[5-7]
Node level Layout configuration
Entity=trek0 Type=Node Role=Manager PCISwitch=pci0
Entity=trek1 Type=Node Role=Backup PCISwitch=pci0
Entity=trek4 Type=Node Role=Other PCISwitch=pci0
Entity=trek5 Type=Node Role=Manager PCISwitch=pci1
Entity=trek6 Type=Node Role=Other PCISwitch=pci1
Entity=trek7 Type=Node Role=Backup PCISwitch=pci1

---

"sbatch" recognizes this new command line option and installs an "opt.ckpt_restart=1" internal flag. This option can also be provided to "sbatch" via the input environment variable "SBATCH_CHECKPOINT_RESTART". This option is copied to the "job_desc_msg_t" structure which will then be copied to the "job_record" structure in the controller. In the controller, it can be referenced via "job_ptr->ckpt_restart". Certain environment variables that are added to the prolog and epilog environments will only be installed when the "-checkpoint-restart" command line flag is installed.

A new variable "SLURM_JOB_NODES_DOWN" is added. It contains a list of allocated nodes that failed during the execution of the task. By default, only the first node to start failing will be listed. If the "-no-kill (-k)" option is specified, then all the nodes that have become defective are listed. This is installed by the controller in a process that deletes the tasks. Each node can access it.

The variable "SLURM_RESTART_COUNT" is modified to be propagated as an environment variable for all SLURM epilogues. The structure "job_ptr->restart_cnt" will only be incremented by the "SBATCH" tasks.

These two environment variables and their values will pass from the controller to the compute nodes via a "Remote Procedure Call" (RPC) message that will extract them and transfer them to a local structure "job_env", which is used to install the environment variables in the prologue and epilogue environments.

The following failure management process flow is written as software and hardware, corresponding to the following table:

| | |
|---|---|
| TS Version | 18.1 |
| BMC | 43.26.00.151 |
| BIOS | BIOS_KNL020.29.01.002 |
| FPGA | 3.9.15.DBG0 |
| Ethernet | 1.63 |
| CWP CPLD | 4.1 |
| Libbpsm | 0.1 |
| FTI library | 0.9.8 |
| OpenMPI | 2.0.2.4 |
| Slurm | 17.11.0-0pre1 |

In a first step, the user will at least code the functions "FTI_Init", "FTI_Protect", "FTI_Snapshot" and "FTI_Finalize". Then, the user will replace "MPI_COMM_WORLD» with "FTI_COMM_WORLD», and adapt the parameters in the FTI configuration file. The user can then use the classic "sbatch" script with an additional option "#SBATCH-checkpoint-restart".

In a second step, SLURM allocates as far as possible to the task three nodes per blade or at least the management and replacement manager nodes of the PCIe switch.

In a third step, during the SLURM prolog, the switch configuration and the mount point are checked. "SLURM_RESTART_COUNT is initialized.

Figure 2:
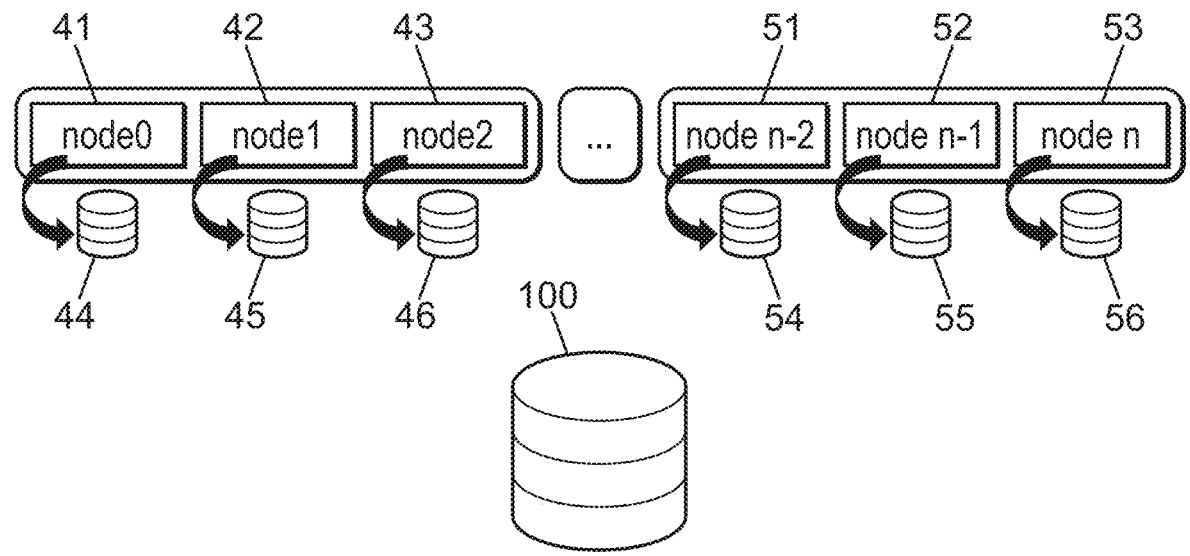
FIG. 2 diagrammatically represents an example of the progress of a local backup step during the failure management method according to one version of the invention.

FIG. 2 diagrammatically represents an example of the progress of a local backup step during the failure management method according to one version of the invention.

In a fourth step, SLURM launches the MPI ranks. FTI writes the checkpoint files at a frequency chosen by the user.

Nodes 41 to 43 are respectively associated with storage media 44 to 46. The nodes 41 to 43 belong to the same compute blade. Nodes 51 to 53 are respectively associated with storage media 54 to 56. The nodes 51 to 53 belong to the same calculation blade, which is different from that of the nodes 41 to 43. The storage media 44 to 46 and 54 to 56 provide a local backup of the state of their respective associated nodes 41 to 43 and 51 to 53, while a parallel file system 100 provides a global backup of the state of the network nodes or at least for a part of the network. The parallel file system 100 is a network file system.

Periodically, ideally with a duration of between 1 and 20 minutes, better still with a duration of between 2 and 10 minutes, for example every 2, 5 or 10 minutes, the storage media 44 to 46 and 54 to 56 ensure a locally backup of the state of their respective associated nodes 41 to 43 and 51 to 53.

Figure 3:
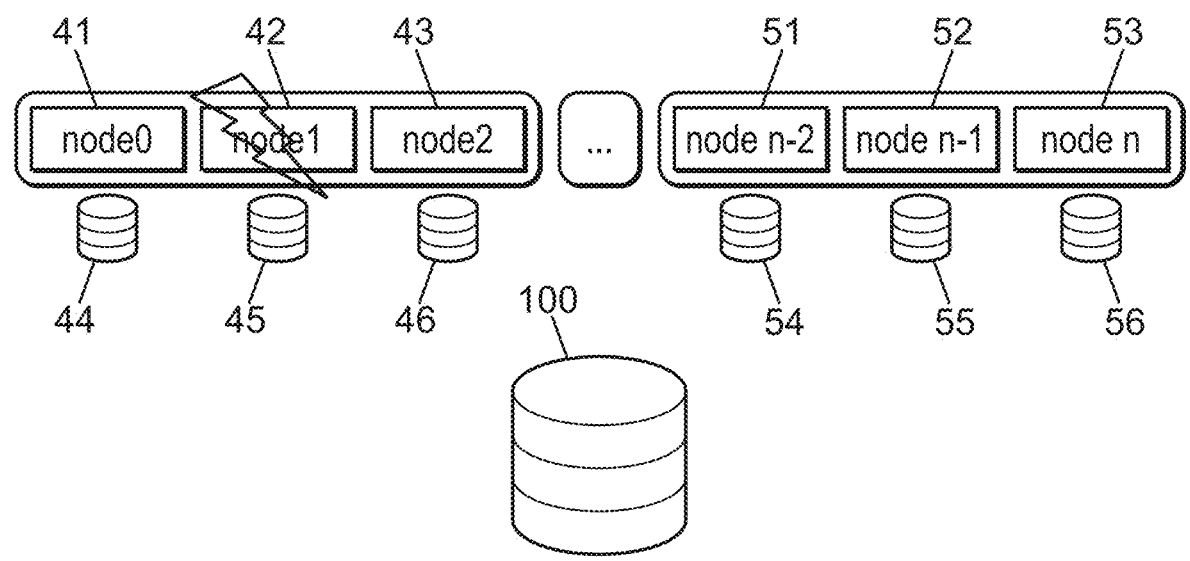
FIG. 3 schematically represents an example of the occurrence of a failure causing a failing node during the failure management method according to one version of the invention.

FIG. 3 schematically represents an example of the occurrence of a failure, rendering a node failing during the failure management method according to one version of the invention.

In a fifth step, SLURM detects the failure of a node and launches the epilogue that contains the update of "SLURM_JOB_DOWN_NODELIST" with the list of failed nodes, the update of "SLURM_RESTART_COUNT", and the retrieving system.

A node, for example, node 42 suffers a failure (symbolized by a little flash in FIG. 3). The other nodes 41 and 43 within this same calculation blade have not failed. The nodes 51 to 53 of the other calculation blade are not defective either.

Figure 4:
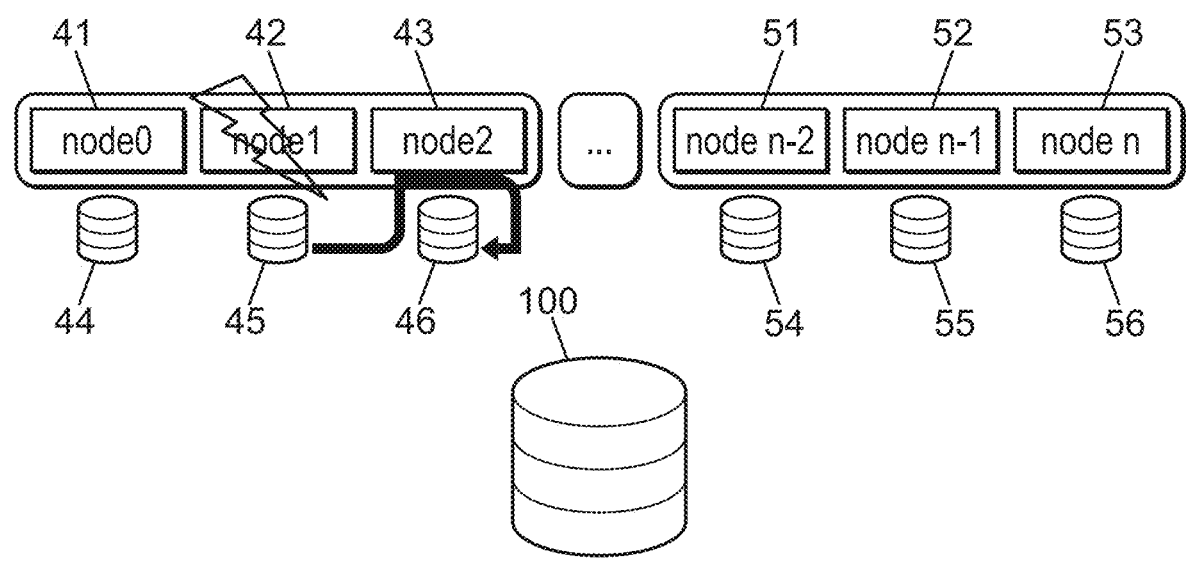
FIG. 4 diagrammatically represents an example of the progress of a step for recovering the local backup for a failing node during the failure management method according to one version of the invention.

The retrieving system launched during the epilogue is separated into two parts, described in FIGS. 4 and 5 respectively during the first and second parts of a sixth step.

FIG. 4 diagrammatically represents an example of the progress of a step for recovering the local backup of a failing node during the failure management method according to one version of the invention.

In the first part of the sixth stage of the retrieving system, the configuration of the PCIe switch is changed and the checkpoint files are retrieved.

The local backup of the state of the failed node 42, performed on storage medium 45, is duplicated on storage medium 46 of the non-failing node 43 via the PCIE switch of the calculation blade and via the non-failing node 43.

FIG. 5 diagrammatically represents an example of the progress of a duplication step and local backups of all the compute nodes of a calculation blade where a node or at least one node has failed, for the nodes of another computing blade added upon the occasion during the failure management method according to one version of the invention.

In the second part of the sixth step of the retrieving system, in the event of a failure, all checkpoint files are kept locally, except for the checkpoint files of the failing node or all nodes belonging to a calculation blade that have at least one failed node. As a precautionary measure, to avoid a second failure within a compute blade that has suffered a first failure, which would make this second failure more difficult to manage, the backups of all the nodes within a computing blade that has had (at least) one failed node, are duplicated upon the storage media associated with the calculation nodes of another calculation blade added for this occasion.

The storage medium 44 transmits the local backup of the non-failing node 41 to the storage medium 64 of node 61 of another calculation blade added for this occasion. The local backups of the non-failing nodes 51 to 53 are kept locally without being duplicated and will be retrieved through their own non-failing nodes 51 to 53 to relaunch the calculation from the current calculation backup state during the same task as the task in progress that failed. The storage medium 46 transmits to storage media 65 and 66 associated with nodes 62 and 63 of the same added calculation blade already containing the node 61, not only the local backup of the state of its associated non-failing node, but also the duplication of the local backup of the state of the failed node 42. Thus, one of the media 65 and 66 will recover the duplication of the backup of the failed node 42 and the other that of the non-failing node 43. All the local backups on the media 41 to 43 and 51 to 53 and 61 to 63, the state of the nodes 41 to 43 and 51 to 53 and 61 to 63 respectively are stored on the media 44 and 46 and 54 to 56 and 64 to 66, are consistent with each other and correspond to the same calculation state from which the same calculation can later be relaunched during the same task as the current task that suffered the failure.

FIG. 6 diagrammatically represents an example of the progress of a step of relaunching the calculation using the own local backups of all the calculation blades without a failing compute node and for the new compute blades added from the duplication of the backups of the nodes of the compute blades having at least one failing node, the calculation being relaunched during the same task where the failure caused the failure of at least one compute node during the process of failure management according to one version of the invention.

In a seventh step, during the same task as the current task having suffered the failure, the calculation can be relaunched from its last saved state for non-failing nodes simply from their own non-duplicated local backups and for the nodes belonging to a compute blade having suffered a failing node, starting from the duplications of the local backups of the nodes of this compute blade with the failing node, the duplications implemented on the nodes of a new compute blade not yet used in the calculation and added upon the occasion to this calculation, i.e., added upon the occasion of the failure occurring.

The non-failing nodes 51 to 53 relaunch the calculation from their own backups stored on their own storage media 54 to 56. Nodes 41 to 43 do not relaunch the calculation and they are excluded. Nodes 61 to 63 of the new calculation blade added for the occasion, relaunch the calculation from the duplications of the backups of nodes 41 to 43 for the compute blade with the failing node, these duplications being stored on their own storage media 64 to 66.

Of course, this invention is not restricted to the examples and the implementation methods described and represented. It has the capacity for numerous user variations according within its field.

---

ANNEX 1: Computer listings used during the previously described failure management method.

For the part "provision/generation configuration switch"
("Layout.d/switch.conf generator")
linestart="Priority=10\nRoot=Cluster\n\n#Root level Layout configuration\nEntity=Cluster Type=Center Enclosed="
linepci="\n\n#Switch level Layout configuration"
linenode="\n\n#Node level Layout configuration"
while true; do
    first=`nodeset -e $nodes | awk '{print $1;}'`
    bmc=bmc${first##[a-z]*[a-z]}
    radical=`echo $first | sed -e 's/[0-9]*$//'`
    unset pci
    for line in `$ssh pmsmModel.py display -n $bmc --neighbour --csv -- column NAME LOCATION --no-header`; do
        if [[ $line = "Error" ]]; then
            echo "error: $first and its bmc $bmc not found by pmsmModel.py"
            exit 3
        fi
        location=`echo $line | cut -d "," -f2`
        name=`echo $line | cut -d "," -f1`
        current=$radical`echo $name | sed -e "s/.*\[bmc//g"| sed -e "s/\]//g"`
        if [ `nodeset -c $nodes -i $current` = 0 ]; then
            continue
        fi
        if [[ ! -v pci ]]; then
            pci=$begin
            liste=$current
        else
            if [ "$pci" = "$begin" ]; then
                liste="$liste,$current"
            else
                echo "error: $pci and $begin set in same neighbourhood for $bmc"
                exit 3
            fi
        fi
        if [[ $end = "Rp" ]]; then
            role="Manager"
        elif [[ $end = "Mp" ]]; then
            role="Backup"
```
end=${location: -2}
begin=${location::-2}
```

ANNEX 1: Computer listings used during the previously
described failure management method.

```
        elif [[ $end = "Lp" ]]; then
            role="Other"
        else
                echo "error: $current has an unknown position on
$pci: $end"
                exit 3
        fi
        linenode="$linenode\nEntity=$current Type=Node
Role=$role PCIswitch=$pci"
    done
    if [ `nodeset -c $liste -i $first` = 0 ]; then
        echo "error: $first and its bmc $bmc not really found in
        $pci"
        exit 3
    fi
    if [[ ! -v listepci ]]; then
        listepci=$pci
    else
        listepci="$listepci,$pci"
    fi
    liste=`nodeset -f $liste`
    linepci="$linepci\nEntity=$pci Type=Switch NodeList=$liste
Enclosed=$liste"
    if [ `nodeset -c $nodes -x $liste` = 0 ]; then
        break;
    fi
    nodes=`nodeset -f $nodes -x $liste`
done
listepci=`nodeset -f $listepci`
total="$linestart$listepci$linepci$linenode"
if [[ -v output ]]; then
    echo -e $total > $output
else
    echo -e $total
fi
exit 0
Example of modification to use the FTI library
int main(int argc, char *argv[ ])
{
    int rank, nbProcs, nbLines, i, M, arg;
    double wtime, *h, *g, memSize, localerror, globalerror = 1;
    MPI_Init(&argc, &argv);
    FTI_Init(argv[2], MPI_COMM_WORLD);
    MPI_Comm_size(FTI_COMM_WORLD, &nbProcs);
    MPI_Comm_rank(FTI_COMM_WORLD, &rank);
    M = (int)sqrt((double)(arg * 1024.0 * 512.0 * nbProcs)/
    sizeof(double));
    nbLines = (M / nbProcs)+3;
    h = (double *) malloc(sizeof(double *) * M * nbLines);
    g = (double *) malloc(sizeof(double *) * M * nbLines);
    initData(nbLines, M, rank, g);
    memSize = M * nbLines * 2 * sizeof(double) / (1024 * 1024);
    FTI_Protect(0, &i, 1, FTI_INTG);
    FTI_Protect(1, h, M*nbLines, FTI_DBLE);
    FTI_Protect(2, g, M*nbLines, FTI_DBLE);
    wtime = MPI_Wtime( );
    for (i = 0; i < ITER_TIMES; i++) {
     int checkpointed = FTI_Snapshot( );
     localerror = doWork(nbProcs, rank, M, nbLines, g, h);
     if (((i%ITER_OUT) == 0) && (rank == 0)) {
      printf("Step : %d, error = %f\n", i, globalerror);
     }
     if ((i%REDUCE) == 0) {
      MPI_Allreduce(&localerror, &globalerror, 1, MPI_DOUBLE,
MPI_MAX,
            FTI_COMM_WORLD);
     }
     if(globalerror < PRECISION) {
       break;
     }
    }
    if (rank == 0) {
     printf("Execution finished in %lf seconds.\n", MPI_Wtime( ) −
     wtime);
    }
```

ANNEX 1: Computer listings used during the previously
described failure management method.

```
    free(h);
    free(g);
    FTI_Finalize( );
    MPI_Finalize( );
    return 0;
}
```
For the part: "NVMe disk detection control and mount point"
```
#!/usr/bin/bash
# Copyright (C) Christophe Laferriere 2017 Bull S. A. S. - All rights
reserved
# Bull, Rue Jean Jaures, B.P.68, 78340, Les Clayes-sous-Bois
# This is not Free or Open Source software. Please contact Bull S. A. S.
# for details about its license.
# This script checks that an NVMe disk is mounted in a given location
# Default hardcoded location for mountpoint
FTI_CKPT_LOCATION="/localckpt"
# Where is mounted the NVMe disk :
NVME_MOUNT_LOCATION=`mount | grep nvme | cut -d ' ' -f 3`
# If no NVMe disk is mounted, exit with error code :
[[ -z $NVME_MOUNT_LOCATION ]] && echo "Error: No NVMe
disk mounted" && exit 1
# Finally check if NVMe is mounted in the right place :
if [[ $FTI_CKPT_LOCATION ==
$NVME_MOUNT_LOCATION* ]] ;
then
  exit 0
else
  echo "Error: NVMe disk is not mounted where it should be
($FTI_CKPT_LOCATION vs $NVME_MOUNT_LOCATION)"
  exit 1
fi
```
For the part: "backup retrieving", script running on the root of the PCIe
switch manager node
```
#!/bin/bash
EXECID=$1
MANAGER=$2 #10050
CRASHEDNODE=$3 # 2 <=> pluton10049
#PCIe switch reconfiguration
bpsm_grab_port 3
ipmitool -H bmc${MANAGER} raw 0x3a 0xcd ${CRASHEDNODE}
echo 1 > /sys/bus/pci/devices/0000:00:00.0/rescan
#Checkpoint recovery and flush
mkdir /localrecovery ; mount /dev/nvme1n1 /localrecovery
cp -r /localrecovery/${EXECID} /scratch/globalckpt/
mv /scratch/globalckpt/${EXECID}/l1 /scratch/globalckpt/
${EXECID}/l4
cp /localckpt/${EXECID}/l1/* /scratch/globalckpt/${EXECID}/l4/
mv /scratch/meta/${EXECID}/l1 /scratch/meta/${EXECID}/l4
```

The invention claimed is:

1. A failure management method for responding to a failed or failing node in a plurality of nodes performing a first task comprising a plurality of calculations, the plurality of nodes forming a network, each node in the plurality of nodes performing a calculation of the plurality of calculations, each node in the plurality of nodes being connected to a respective storage medium via a link that is redirectable to connect the respective storage medium to a different node in the plurality of nodes, and each node being configured to locally back up its state to its respective storage medium where the local backup of the state of each node is coherent with one another so each local backup corresponds to a same state of the first task, the method comprising:
redirecting a redirectable link between a failed or failing first node in the plurality of nodes and a first storage medium to connect the first storage medium to an operational second node in the plurality of nodes, wherein the failed or failing first node was performing a first calculation of the plurality of calculations;
retrieving the local backup of the state of the failed or failing first node to the operational second node;

adding a new third node to the plurality of nodes, the new third node not performing any calculation of the first task before failure of the failed or failing first node, the new third node being added to the plurality of nodes only after failure of the failed or failing first node to then relaunch the first calculation of the failed or failing first node within said first task, the new third node connected to a third storage medium via a redirectable link;

transmitting the local backup of the state of the failed or failing first node to the third storage medium of the new third node; and storing the transmitted local backup of the state of the failed or failing first node on the third storage medium of the new third node, wherein, for at least one of the plurality of nodes performing said first task, the storage media are flash memories, and wherein said first task is a distributed application running on said plurality of nodes, said plurality of nodes comprising at least 1000 compute nodes.

2. The failure management method according to claim 1, wherein each of the plurality of nodes is within a first computing blade, and wherein all local backups of the plurality of nodes within the first computing blade are transmitted to new nodes within a new computing blade, the new nodes of the new computing blade being added to the network upon failure of the failed or failing first node.

3. The failure management method according to claim 1, further comprising relaunching said first calculation from the local backups during the first task being performed during which the failed or failing first node failed.

4. The failure management method according to claim 3, further comprising during the relaunching step:

relaunching nodes that are not failing and do not belong to a first computing blade that includes the failed or failing first computing node, the relaunching being carried out from the local backup of the state of the nodes that are not failing and do not belong to said first computing blade.

5. The failure management method according to claim 3, wherein after the relaunching step, the nodes are synchronized with one another to relaunch the nodes in the same state of said first task.

6. The failure management method according to claim 1, wherein a switch connects the plurality of nodes to the storage media of each of the nodes, and the link between each storage medium comprises the switch, and the redirection of the link between each node and the storage medium of each node so as to connect said storage medium of each node to said another one of the nodes, is performed by a switch changing of the switch connecting the nodes to the storage media of each of the nodes.

7. The failure management method according to claim 1, wherein the retrieving step changes the attachment of the storage medium of the local backup of the state of the failed or failing first node via a switch to which is attached to the failed or failing first node and the storage medium of the failed or failing first node, the switch changing the attachment without passing through the failed or failing first node itself.

8. The failure management method according to claim 7, wherein the change of attachment is achieved by sending a command to the switch, the command passing through one of plurality of nodes attached to the switch by a management port.

9. The failure management method according to claim 6, wherein the switch is a PCIe switch.

10. The failure management method according to claim 6, wherein 3 to 10 of the plurality of nodes are attached to the switch.

11. The failure management method according to claim 1, further comprising, for all the nodes of the network performing said first task, including when none of the nodes performing said first task are failing, a global backup step for all the nodes, the global backup step being performed less often than any local backup steps for the nodes of the network performing said first task.

12. The failure management method according to claim 1, wherein the flash memories are NVMe memories.

13. The failure management method according to claim 2, wherein the failed or failing first node was performing a first calculation, and wherein the method further comprises:

after storing the transmitted local backup, a relaunching step to relaunch said first calculation from the local backups during the first task being performed during which the failed or failing first node failed.

14. A failure management method for responding to a failed or failing node in a plurality of nodes performing a first task, the plurality of nodes forming a network, the first task comprising a plurality of calculations, comprising:

storing a local backup of the state of each node of the plurality of nodes to a different respective storage medium linked, via different respective links, to each node, each link between a storage medium and a node capable redirectable to another node;

retrieving the local backup of the state of a first failed or failing node by redirecting said link between the first failed node and the storage medium of the first failed or failing node to connect the storage medium of the first failed or failing node to an operational node of the plurality of nodes, wherein the first failed or failing node was performing a first calculation of the plurality of calculations;

transmitting the local backup of the state of the first failed or failing node to the storage medium of said operational node via the redirected link so that the storage medium of the operational node stores the local backup of the state of the first failed or failing node, the operational node already having performed a calculation of said plurality of calculations, wherein, the plurality of nodes have performed the first task together so that the local backup of the state of each node used in the retrieving step are coherent with one another so each local backup corresponds to a same state of said first task; and after said first failed or failing node fails, adding a new node to the plurality of nodes, the new node not performing any calculation of the first task before failure of the first failed or failing node, the new node being added to the plurality of nodes only after failure of the first failed or failing node to then relaunch the first calculation of the first failed or failing node within said first task, and performing a return step of transmitting the local backup of the state of the first failed or failing node from the storage medium of the operational nodes to a local storage medium of the new node so that the local storage medium of the new node stores the local backup of the state of the first failed or failing node, wherein, for at least one of the plurality of nodes performing said first task, the storage media are flash memories, and wherein said first task is a distributed application running on said plurality of nodes, said plurality of nodes comprising at least 1000 compute nodes.

15. The failure management method according to claim 1, wherein all nodes of said plurality of nodes being synchronized together so that the loss of a single node of said plurality of nodes because its local backup can no longer be recovered is followed by the loss of all calculation steps of all nodes of said plurality of nodes.

16. A failure management method for responding to a failed or failing node in a plurality of computing nodes performing a first task, the plurality of computing nodes forming a network, the first task is a distributed application comprising a plurality of calculations, each computing node in the plurality of computing nodes performing a calculation of the plurality of calculations, each computing node in the plurality of nodes being allocated by a first resource manager and being operably connected to a respective storage medium via a link that is redirectable to connect the respective storage medium to a different computing node in the plurality of nodes, and each computing node being configured to locally back up its state to its respective storage medium where the local backup of the state of each computing node is coherent with one another so each local backup corresponds to a same state of the first task, the method comprising:

determining, by the first resource manager, that a first computing node has failed or is failing;

redirecting a redirectable link between the failed or failing first computing node in the plurality of nodes and a first storage medium to connect the first storage medium to an operational second computing node in the plurality of nodes, wherein the failed or failing first computing node was performing a first calculation of the plurality of calculations;

retrieving the local backup of the state of the failed or failing first node to the operational second computing node adding a new third computing node to the plurality of computing nodes, the new third computing node not performing any calculation of the first task before failure of the failed or failing first node, the new third computing node being added to the plurality of computing nodes only after failure of the failed or failing first node to then relaunch not yet achieved calculation of the failed or failing first computing node within said first task, the new third computing node connected to a third storage medium via a redirectable link;

transmitting the local backup of the state of the failed or failing first computing node to the third storage medium; and storing the transmitted local backup of the state of the failed or failing first computing node on the third storage medium, wherein, for at least one of the plurality of nodes performing said first task, the storage media are flash memories, and wherein said first task is a distributed application running on said plurality of nodes, said plurality of nodes comprising at least 1000 compute nodes.

* * * * *